UNITED STATES PATENT OFFICE.

HIRAM Y. McBRIDE, OF ARTESIA, NEW MEXICO.

PROCESS OF CLEANING ANIMAL HAIR AND PRODUCING FERTILIZER.

1,218,573. Specification of Letters Patent. Patented Mar. 6, 1917.

No Drawing. Application filed October 6, 1915. Serial No. 54,390.

*To all whom it may concern:*

Be it known that I, HIRAM Y. McBRIDE, a citizen of the United States, residing at Artesia, New Mexico, have invented a certain new and useful Process of Cleaning Animal Hair and Producing Fertilizer, of which the following is a specification.

My invention provides for ridding animal hair, such as wool, of grease or suint and other foreign matter and concurrently producing a valuable fertilizer or fertilizer component. The process is particularly adaptable to the treatment of sheep wool, and it will be sufficient to describe the treatment of wool with the understanding that the process is adaptable to the treatment of other animal hair where the conditions are similar.

Briefly stated, the process consists in applying to raw wool a comminuted, granulated or pulverized absorbent material, such as gypsum, which absorbs the animal grease or suint carried by the wool. The wool is then agitated, beaten, or otherwise freed of the absorbed moisture, sweat and grease and other extraneous matter, such as vegetable fiber and sheep manure. The removed material is a valuable fertilizer or a component for the production of various fertilizing compounds by the addition of other materials. In some cases another cleaning agent, such as sodium bicarbonate, is then applied to the wool to remove from it any remaining part of the first cleaning agent and also to bleach, or soften, the wool. This second medium is removed from the wool by agitating, beating, blowing, or otherwise.

The entire process is a dry one as distinguished from the customary wet processes, which involve the discharge into streams of deleterious, greasy refuse. My dry process is moreover more effective in cleaning the wool, and at the same time produces a valuable fertilizer.

I will now give in more detail a description of specific ways of carrying out the process.

For the first cleaning agent I have found that gypsum, either raw or roasted, is a very valuable material. Gypsum that I have employed for this purpose has approximately the following composition:

CaO _____ 32.56%
$SO_3$ _____ 46.51%
Water _____ 20.93% or $CaSO_4 2H_2O$

The gypsum may be used in granulated, ground or pulverized form. If desired, the gypsum may be roasted to evaporate a certain part of the water content. This material is applied to the wool and absorbs the greasy materials from the wool. The wool is then beaten or otherwise treated to discharge the gypsum with its absorbed greases and other extraneous matter contained in the wool, and this extracted material forms a fertilizer or fertilizer component, comprising the following materials having fertilizing value: potassium salts, nitrates or ammonium compounds, calcium compounds, manure and other organic matter or humus, such as vegetable fiber. The wool is then treated with sodium bicarbonate or common soda ($NaHCO_3$) suitably pulverized or ground, which extracts the remnants of the gypsum and bleaches the wool.

By this process the wool is cleaned in a superior manner and all foreign matter is removed for the saving of freight charges in shipping. At the same time, the shrinkage of the actual animal fiber is less than in the ordinary process. Concurrently, a valuable fertilizer is produced and the nuisance of polluting streams incident to the ordinary wet process is avoided.

Gypsum is a preferred material for the initial treatment of the wool, but in some cases other material capable of producing equivalent results may be used. Other absorbent earths or minerals having suitable characteristics may be employed. For the second cleaning agent equivalent pulverulent material having more or less bleaching capacity may be substituted for the soda.

Suitable machinery will usually be employed in carrying out the steps of the process although it is capable of being carried out by hand operations.

I claim:

1. The process of treating wool, consisting in applying to raw wool a comminuted, grease-absorbing, earthy material, and then removing the material with its absorbed animal greases and other matter extraneous to the wool.

2. The process of treating wool, consisting in applying to raw wool a comminuted grease-absorbing, earthy material, removing the material with its absorbed animal greases and other matter extraneous to the wool, and then applying to the wool pulverized sodium bicarbonate to remove remains of the first-named material and bleach or soften the wool, and then removing the sodium bicarbonate.

3. The process of treating wool, consisting in applying to the wool finely divided gypsum and then removing from the wool the gypsum, with its absorbed matter and other extraneous material.

4. The process of cleaning wool, consisting in applying to the wool granulated or pulverized gypsum, then removing the gypsum, with its absorbed material and other matter extraneous to the wool, then applying to the wool pulverized sodium bicarbonate and then freeing the wool therefrom.

5. The process of cleaning wool and concurrently producing a fertilizer component, consisting in applying to raw wool a finely divided, grease-absorbing, earthy material, and then discharging from the wool the extraneous material, comprising animal greases absorbed by the cleaning medium, manure, humus and the like.

6. The process of cleaning wool and concurrently producing a fertilizer, consisting in treating raw wool with granular or pulverized gypsum and then discharging from the wool extraneous matter comprising animal greases absorbed by the gypsum, manure, humus and the like.

7. The process of cleaning wool, consisting in treating raw wool with finely divided, more or less hydrated material, having substantially the formula $CaSO_4$, and then removing the cleaning material with its absorbed greases and other extraneous materials from the wool.

8. The process of cleaning wool and concurrently producing a fertilizer component, consisting in applying to raw wool a finely divided, more or less hydrated material, having substantially the formula $CaSO_4$, and then discharging from the wool the cleaning material with its absorbed animal sweat and grease and other extraneous matter comprising manure, humus and the like.

HIRAM Y. McBRIDE.